: US 9,316,017 B1
(12) United States Patent
Slaughter

(10) Patent No.: US 9,316,017 B1
(45) Date of Patent: Apr. 19, 2016

(54) RECONFIGURABLE SQUARE PORTABLE HUNTING BLIND

(71) Applicant: Jerry Micah Slaughter, Huntsville, TX (US)

(72) Inventor: Jerry Micah Slaughter, Huntsville, TX (US)

( * ) Notice: Subject to any disclaimer, the term of this patent is extended or adjusted under 35 U.S.C. 154(b) by 0 days.

(21) Appl. No.: 14/474,415

(22) Filed: Sep. 2, 2014

Related U.S. Application Data

(60) Provisional application No. 61/959,835, filed on Sep. 3, 2013.

(51) Int. Cl.
*E04H 15/00* (2006.01)
*A01M 31/00* (2006.01)
*A01M 31/02* (2006.01)

(52) U.S. Cl.
CPC ........... *E04H 15/001* (2013.01); *A01M 31/025* (2013.01)

(58) Field of Classification Search
CPC ..... E04H 15/001; E04H 15/008; E04H 15/48; A01M 31/025
USPC ......... 135/97, 143, 157, 901, 117, 119, 120.3
See application file for complete search history.

(56) References Cited

U.S. PATENT DOCUMENTS

| 2,967,534 | A | * | 1/1961 | Silye | 135/143 |
| 3,018,857 | A | * | 1/1962 | Parham | 52/63 |
| 3,118,186 | A | * | 1/1964 | Moss | 52/71 |
| 3,134,200 | A | * | 5/1964 | Moss | 52/745.14 |
| 3,169,543 | A | * | 2/1965 | McGerty | 135/152 |
| 3,333,373 | A | * | 8/1967 | Taylor et al. | 52/63 |
| 3,709,237 | A | * | 1/1973 | Smith | 135/87 |
| 3,827,019 | A | * | 7/1974 | Serbu | A41F 1/002 135/117 |
| 3,913,598 | A | | 10/1975 | Glutting, Jr. | |
| 3,996,706 | A | * | 12/1976 | Bomgaars | 52/71 |
| 4,067,346 | A | | 1/1978 | Husted | |
| 4,640,061 | A | * | 2/1987 | Trumley | 52/71 |
| 5,301,706 | A | | 4/1994 | Jones | |
| 5,352,149 | A | | 10/1994 | Melashenko | |
| 5,373,863 | A | * | 12/1994 | Prizio | 135/97 |
| 5,592,960 | A | * | 1/1997 | Williams | A01M 31/025 135/117 |
| 6,553,725 | B2 | * | 4/2003 | Washington | 52/64 |
| 6,981,540 | B2 | * | 1/2006 | Deblois | E04H 15/32 135/117 |
| 7,117,644 | B2 | * | 10/2006 | Dehart | 52/36.1 |
| 7,743,781 | B2 | * | 6/2010 | Slaughter | 135/117 |
| 8,256,443 | B2 | * | 9/2012 | Neal | 135/96 |
| 8,429,858 | B1 | * | 4/2013 | Robinson et al. | 52/79.5 |
| 8,579,007 | B2 | * | 11/2013 | Pottmeyer | A01M 31/025 160/135 |
| 2002/0026742 | A1 | * | 3/2002 | Washington | A01M 31/025 43/1 |
| 2005/0108955 | A1 | * | 5/2005 | Howe et al. | 52/79.5 |
| 2008/0210283 | A1 | * | 9/2008 | Hinz | E04H 15/32 135/121 |
| 2015/0053246 | A1 | * | 2/2015 | Lange | 135/115 |

* cited by examiner

*Primary Examiner* — Noah Chandler Hawk
(74) *Attorney, Agent, or Firm* — John R. Casperson

(57) ABSTRACT

The invention provides a portable reconfigurable hunting blind assembly utilizing eight generally rectangular frames joined together side edge to side edge by seven hinges for accordion folding, and a camouflage covering mounted to each of the frames to define eight panel-shaped wall units, the camouflage covering defining a window in at least some of the wall units.

16 Claims, 5 Drawing Sheets

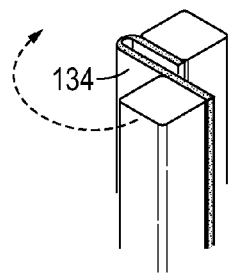
FIG. 2
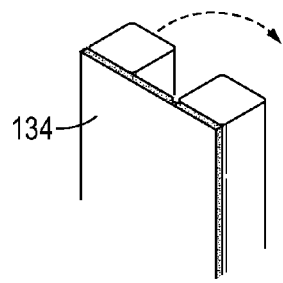
FIG. 3
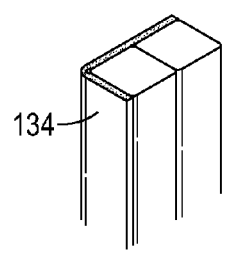
FIG. 4
FIG. 5
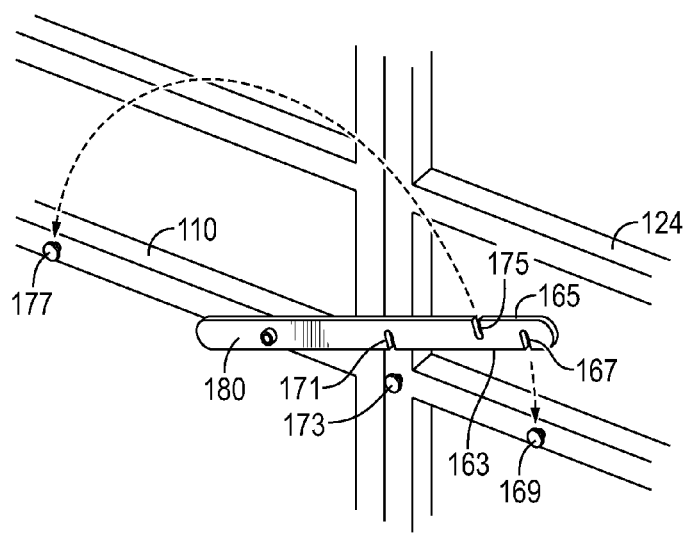
FIG. 6
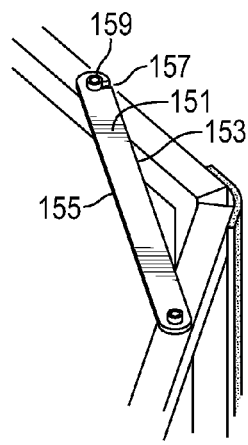

US 9,316,017 B1

RECONFIGURABLE SQUARE PORTABLE HUNTING BLIND

CROSS REFERENCES TO RELATED APPLICATIONS

This application claims the benefit of U.S. Provisional Application No. 61/959,835 filed Sep. 3, 2013, the disclosure of which is herein incorporated by reference.

FIELD OF THE INVENTION

The invention relates to a reconfigurable square portable hunting blind.

BACKGROUND OF THE INVENTION

A lack of flexibility in the various ways a blind can be deployed is a shortcoming of blinds constructed according to the prior art.

Two hunters need a bigger blind than a single hunter. Deer hunters are best served with a windowed blind, while waterfowl hunters are best served by an open-topped blind. A bow hunter requires a differently shaped window than a rifleman. A blind which can be reconfigured to meet all of these various needs would be very desirable.

Prior art portable blinds often have no roof, or an inadequate roof. For deer hunting, a roof is desirable, as it darkens the inside of the blind, making detection of the blind occupants less likely. A waterproof roof is even more desirable, as it shelters the occupants from the sun and rain, making it easier for them to remain still.

Also, prior art blinds are often complicated to assemble, and can have many parts. A blind which is easy and fast to assemble, requires no tools, and has few parts would be very desirable.

Weight is also a factor in the desirability of a blind. A portable blind which is lightweight is easier to transport, and thus better suited for its intended purpose.

Transport size is also an important factor for a portable blind. A blind which collapses to a small size is easier to carry and transport, and thus better suited for its purpose.

Another factor for the desirability of a blind is structural stability. A blind which is structurally stable can provide a rifleman or a cameraman with a solid rest, enabling more accurate shots or photos.

Another factor for a blind is ease of repair. A blind which has parts which are easily replaced can easier to repair and can also be readily modified to better blend in with its environment.

My earlier patent, U.S. Pat. No. 7,743,781 issued Jun. 29, 2010, the disclosure of which is incorporated by reference herein, solves many of the forgoing deficiencies with a six-paneled blind. It is an object of the invention to provide an eight-paneled blind, which, in its preferred embodiments, meets the foregoing needs.

SUMMARY OF THE INVENTION

One embodiment of the invention provides a portable reconfigurable hunting blind assembly comprising eight generally rectangular frames joined together side edge to side edge by seven hinges for accordion folding, and a camouflage covering mounted to each of the frames to define eight panel-shaped wall units, said camouflage covering defining a window in at least some of said wall units.

BRIEF DESCRIPTION OF THE DRAWINGS

FIG. 2 is a pictorial illustration of a corner structure of the frame in a folded configuration.

FIG. 3 is a pictorial illustration of the corner structure of the frame from FIG. 2 in a flattened configuration.

FIG. 4 is a pictorial illustration of the corner structure of the frame from FIG. 3 in a configuration to form a corner of the blind when in a square configuration.

FIG. 5 is a pictorial illustration of a latch to stabilize the blind in a square configuration.

FIG. 6 is a pictorial illustration of a latch to stabilize the blind in an octagonal configuration.

DETAILED DESCRIPTION OF THE INVENTION

Figure 7:
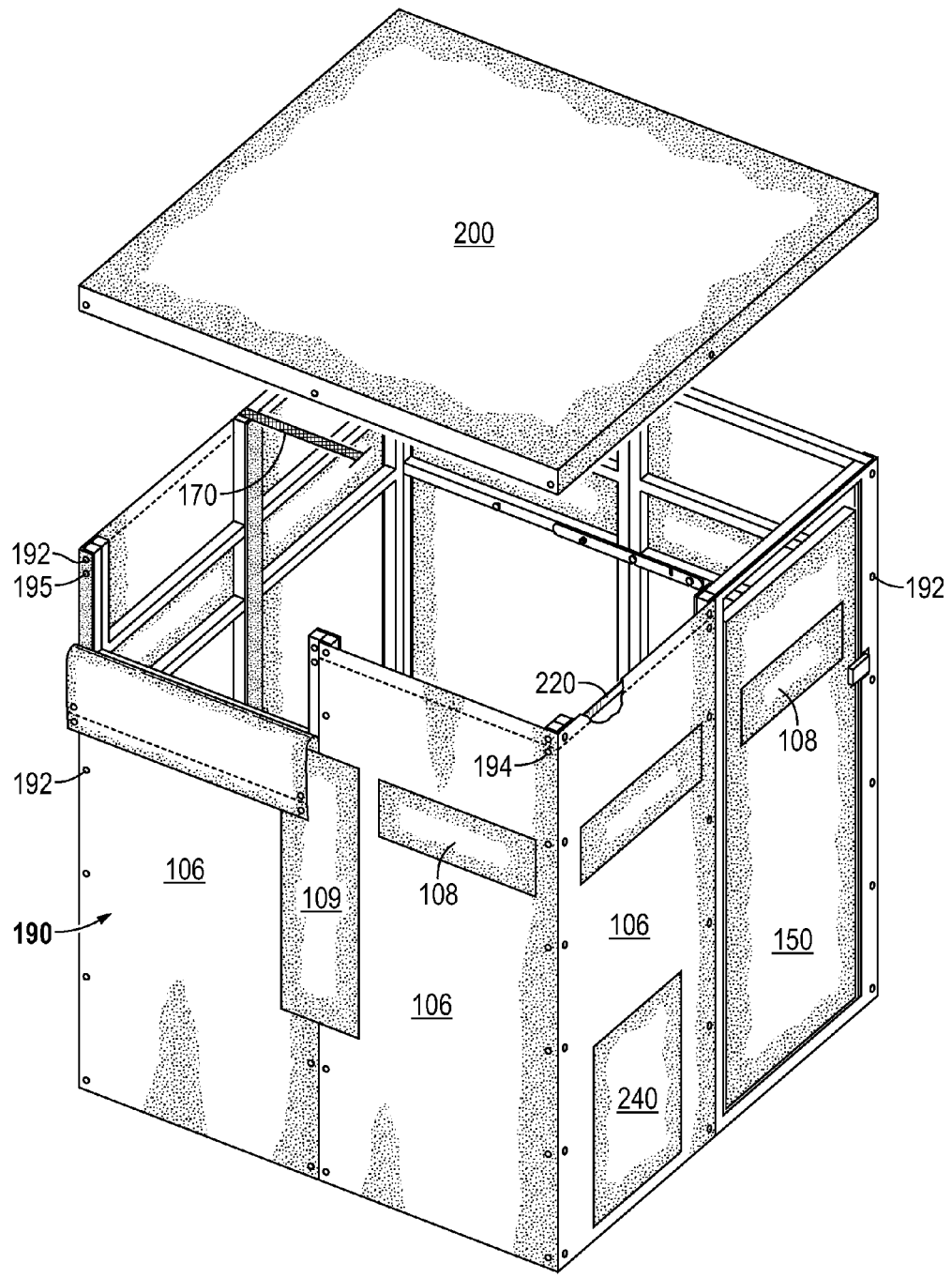
FIG. 7 is a pictorial illustration of the blind in FIG. 1 with coverings on the frames, and showing a roof in lifted configuration.
Figure 9:
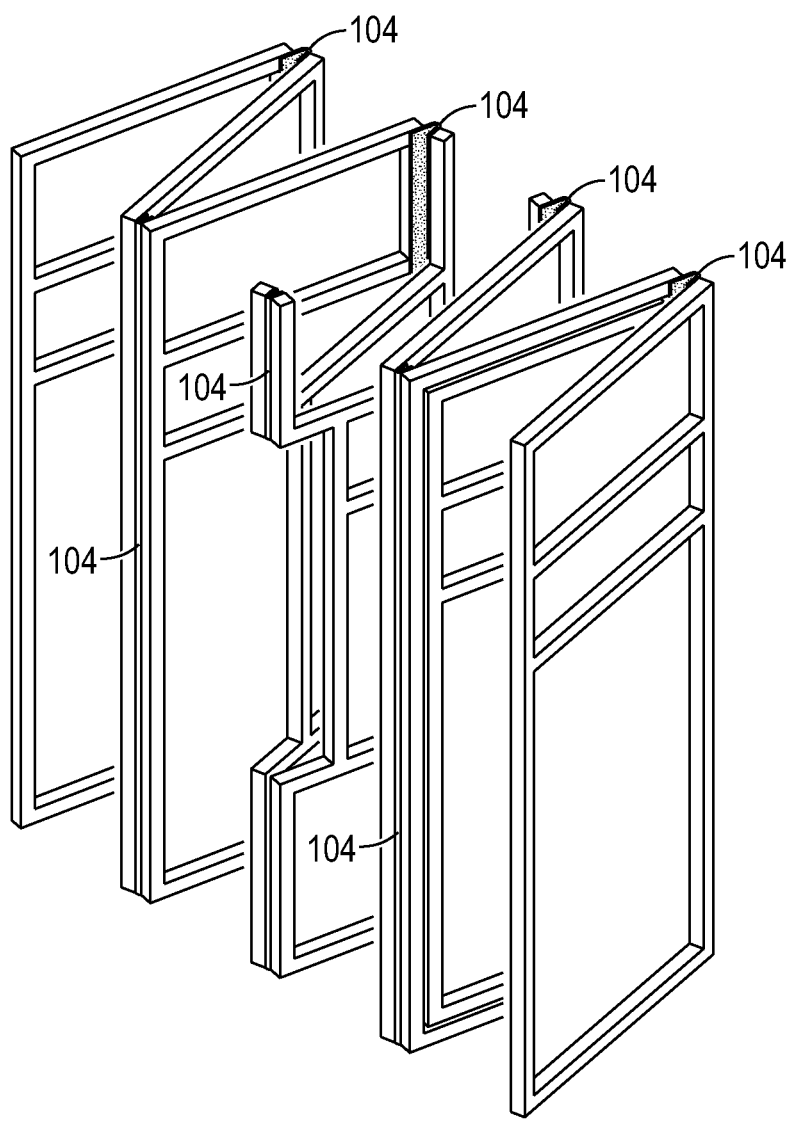
FIG. 9 is a pictorial illustration of the blind frame being accordion folded.

One embodiment of the invention provides a portable reconfigurable hunting blind assembly 102 comprising eight generally rectangular frames joined together side edge to side edge by seven hinges 104 for accordion folding (see FIG. 9), and a camouflage covering mounted to each of the frames to define eight panel-shaped wall units 106, said camouflage covering defining a window 108 in at least some of said wall units (see FIG. 7).

The frames are identified as a first frame 110 on a first end of the hunting blind assembly, a second frame 112 adjacent to the first frame, a third frame 114 adjacent to the second frame, a fourth frame 116 adjacent to the third frame, a fifth frame 118 adjacent to the fourth frame, and a sixth frame 120 adjacent to the fifth frame, a seventh frame 122 adjacent to the sixth frame, and an eighth frame 124 adjacent to the seventh frame, said eighth frame forming a second end of the hunting blind assembly.

The frames are attached by hinges which preferably define seven hinge lines. The hinges are identified as a first hinge 130 between the first and second panels, a second hinge 132 between the second and third panels, a third hinge 134 between the third and fourth panels, a fourth hinge 136 between the fourth and fifth panels, a fifth hinge 138 between the fifth and sixth panels, a sixth hinge 140 between the sixth and seventh panels, and a seventh hinge 142 between the seventh and eighth panels.

The first hinge permits the first frame and the second frame to swing over an angle of about 270 degrees with respect to each other. The third hinge permits the third and fourth frames to swing over an angle of about 270 degrees with respect to each other. The fifth hinge permits the fifth and sixth frames to swing over an angle of about 270 degrees with respect to each other. The seventh hinge permits the seventh and eighth frames to swing over an angle of about 270 degrees with respect to each other. FIG. 4 is illustrative and shows third hinge 134 forming a corner of the blind when in a square configuration. FIG. 2 illustrates the third hinge 134 bent for accordion folding of the blind. FIG. 3 illustrates with reference to third hinge 134 a suitable spacing between the frames for the first, third, fifth and seventh hinges.

Preferably, one of the frames carries a door 150. The door is formed by a generally rectangular door frame mounted within the frame of the panel. Preferably the door frame is hingedly connected to the selected one of the frame. Preferably the door frame hinge is a living hinge, more preferably a full-length living hinge. The door frame carries a camouflage covering and functions as one of the panels when the door is closed. A magnetic latch can be used to fasten the door for silent opening and closing.

Preferably, the fourth and fifth frames come together to from a bow-hunter's window 109, which is vertically elongated and positioned between the edges of the frames. The remaining windows are preferably horizontally elongated, with a window sill defining the bottom edge of each, to form a rifleman's gun rest.

The windows are preferably covered by a removable dark screening. At least the bow hunter's window is preferably a shoot-through screen, which is designed to permit an arrow to pass with minimal deflection, the intention being that a bow hunter will utilize all screens as well as a roof for maximum concealment. A rifle hunter will most likely open at least one screen in each of the four walls.

Figure 1:
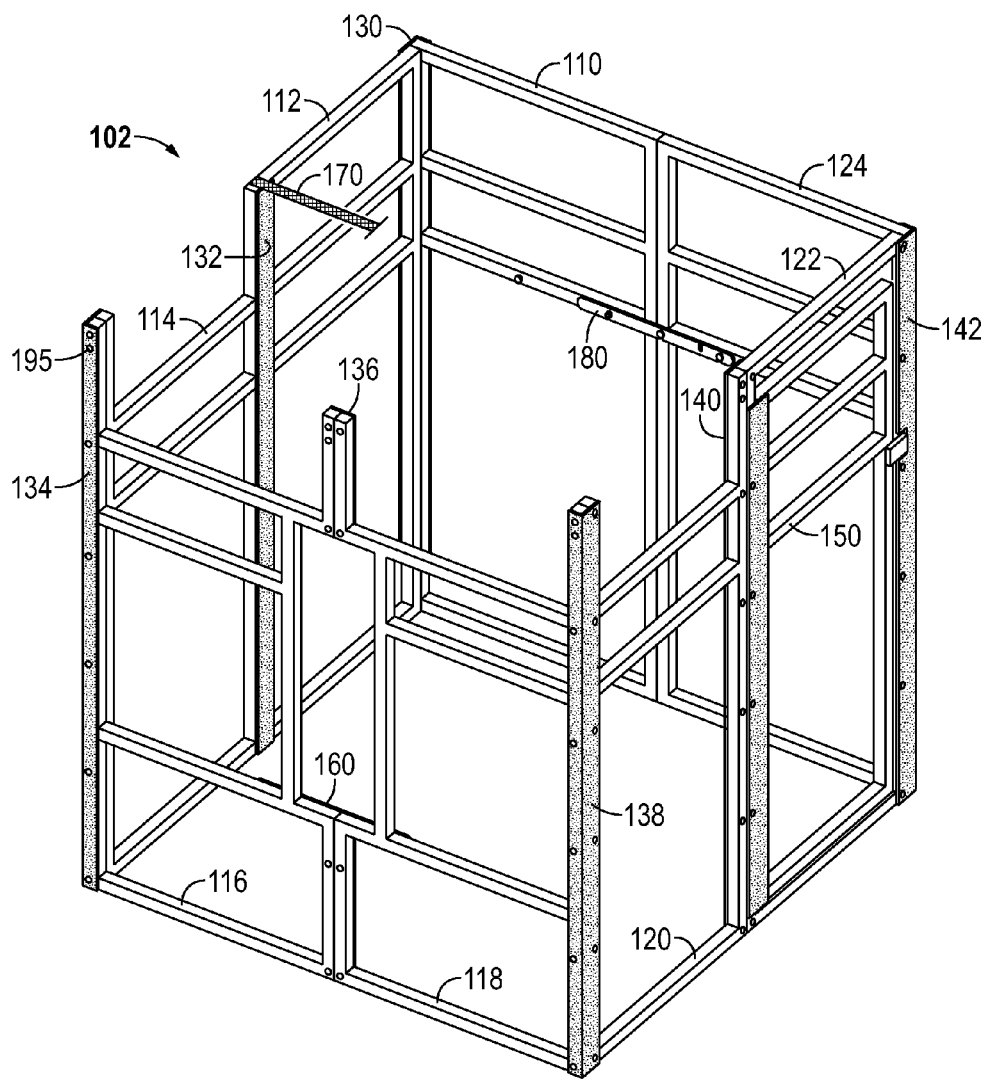
FIG. 1 is a pictorial illustration of a frame for the blind arranged in a square configuration.
Figure 8:
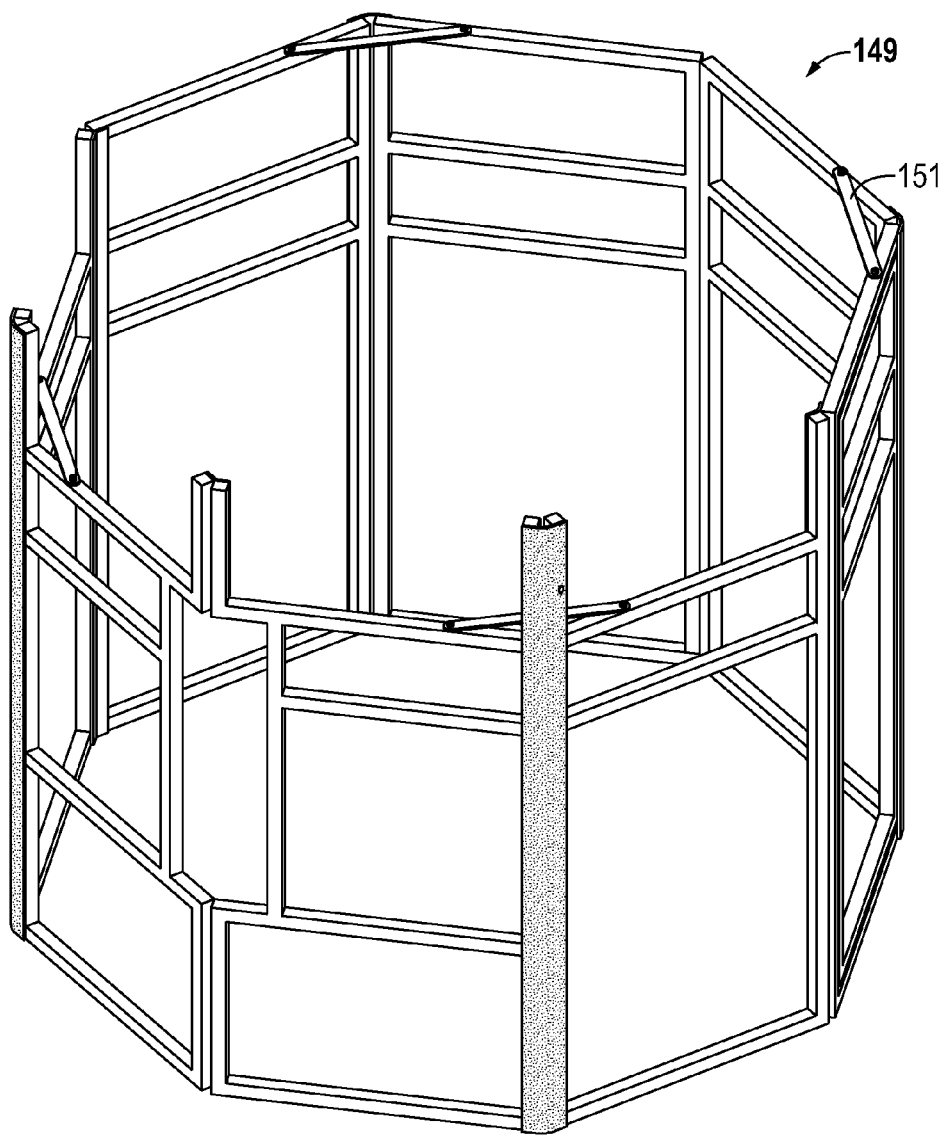
FIG. 8 is a pictorial illustration of the blind frame in an octagonal configuration.

The hunting blind assembly is configurable into a self-standing closed square as illustrated in FIG. 7. By "square" is meant the footprint is square. However, the blind can also be reconfigured into a self-standing closed isosceles hexagonal structure and further reconfigured into a self-standing closed regular octagonal structure 149 as shown in FIG. 8. To change the blind into the isosceles hexagonal structure, the blind can be expanded from the FIG. 1 configuration by spreading hinges 132 and 140 apart. To form the octagonal structure, corners 1, 3, 5 and 7 can be latched at approximately a 135 degree angle.

When the blind is in a closed square configuration, corners 1, 3, 5 and 7 form 90 degrees angles. The first, third, fifth and seventh hinges bias their adjacent panels towards an octagonal configuration. The hunting blind preferably further comprises means for restraining the panels in the closed square configuration, which creates a state of tension and make the structure more stable. For example, straps, latches, clamps, pegs or zip-ties could be used to restrain the panels.

In one embodiment, the reconfigurable hunting blind assembly further comprises a latch element 160 to extend between the fourth frame 116 and the fifth frame 118 when deployed and restrain the fourth and fifth frames against bowing out when the blind assembly is in the square configuration.

In another embodiment, the portable reconfigurable hunting blind assembly further comprises a strap 170 to extend across the blind, such as between the seventh frame 122 and the second frame 112 when deployed, to restrain the sixth and seventh frames and the second and third frames from bowing out when the blind is in the square configuration.

In another embodiment, a latch element 180 is provided to extend between the eighth frame and first frame when deployed to restrain the eighth frame 124 and the first frame 110 from bowing out when the blind assembly is in the square configuration.

In one embodiment of the invention, a camouflage covering 190 is removably mounted on one side of each frame with a plurality of releasable fasteners 192, for example, snap or hook and loop fasteners. In the illustrated embodiment, each camouflage covering has an inner surface facing a frame, an outer surface, an upper end, and at least one fastener half 194 on the outer surface near the upper end for attaching a cover 200 that forms a roof over an upper end of the blind. Fasteners 195 are preferably positioned near the upper end of at least some of the frame elements, for example, frames 3, 4, 5 and 6 to attach the roof when the coverings are rolled down as described hereinbelow.

In one embodiment of the invention, the reconfigurable hunting blind assembly has a covering 200 positioned over the upper end of the blind forming a roof. The covering has a periphery, a top side, and a bottom side, and a plurality of fastener halves positioned on the bottom side around the periphery for attachment to complementary fastener halves located on the upper ends of the outside surfaces of the camouflage coverings on the frame.

In the illustrated embodiment, the camouflage coverings on frames 3, 4, 5 and 6 roll or fold down (the covering on frame 4 illustrated) from the upper ends and fastener halves 195 are positioned at the upper end of frames 3, 4, 5 and 6 for attachment to complementary fastener halves on a periphery of a covering forming a roof. The roof can also be folded back. The combination of folding down the side coverings and rolling back or removing the roof provides additional vertical clearance for wing shooting. However, the additional clearance is generally unnecessary at the back of the blind, so the four frames at the back of the blind (frames 1, 2, 7 and 8) have top plates across their upper ends for structural stability, whereas the frames at the front of the blind (frames 3, 4, 5 and 6) are lacking in top plates across their upper ends, the upper ends being defined by the corner posts of the frames.

To provide better rigidity in the front panels, the camouflage coverings on frames 3, 4, 5 and 6 preferably have a stiffener element 220 extending across their upper ends. Wood, plastic or metal is suitable, and the element is preferably sewn in the covering. The camouflage coverings on frames 1, 2, 7 and 8 can be lacking in the stiffener element across their upper ends, the function instead being served by the top plate, or, in the case of the covering for the door, the top plate of the door frame.

To stabilize the blind in an octagonal configuration, at least two opposed latches 151 each carried by a separate panel and deployable to connect adjacent panels at an angle of about 135 degrees are provided. If desired, and as illustrated, four latches can be used.

In one embodiment of the invention, one of the coverings for the frames defines a flap 240 in its lower portion having a plurality of releasable fasteners such as hook and loop fasteners on its periphery forming a dog door. Preferably, the flap is permanently attached along the top and folds inwardly.

In a preferred embodiment, each frame is bounded by a pair of uprights of square cross section and adjacent frames are joined together by thermoplastic living hinges alternating between connection to the front sides of adjacent frames and the back sides of adjacent frames, the hinge being placed on the back sides of the frames between the fourth and fifth frames. The thermoplastic is preferably selected from polyethylene and polypropylene and is full length. The frames joined on their front sides by the living hinge are preferably spaced apart by a distance of from 1 to 1.5 times the width of a side of the uprights, preferably by about the width of the uprights, see FIG. 3, and the frames joined on their back sides by the living hinge are separated by a distance of less than 0.25 times the width of a side of the uprights, preferably having near zero separation, so that flat sides of adjacent uprights are substantially squarely facing each other flat side to flat side when the blind assembly is in a square configuration. The frames joined on their front sides by a living hinge form the corners of the blind assembly. The thinned section of the hinge, if present, is preferably alongside a corner of one of the uprights of one of the frames. See FIG. 3. When the blind is in the square configuration, the flat sides of adjacent uprights are substantially in parallel contact each other. More preferably, adjacent frames contact each other for substantially the entirety of their facing flat faces.

The frames are preferably constructed of tubing having a square cross section. Three quarter inch square tubing has been tested with good results. The latch for holding frames at a 180 degree angle is constructed of bar stock having a first end and a second end pivotally connected to an inwardly facing portion of the frame at a location near its first end. The bar stock has a leading edge 163 and a trailing edge 165 with at least one notch 167 in the leading edge to ride over and engage an end flanged post 169 protruding from an inwardly facing portion of an adjacent frame. Preferably, the bar stock further defines a second notch 171 in the leading edge to ride over and engage a second end flanged post 173 protruding from the adjacent frame. More preferably, the bar stock further defines a notch 175 in the trailing edge to ride over and engage with an end flanged post 177 protruding from an inwardly facing portion of the same frame that is pivotally connected to the bar for storage of the bar. The latch bar preferably fits snugly against both frames when in the latched position to stabilize the frame and not rattle if the blind is buffeted by winds. Both the latch and frame are preferably formed of aluminum.

For the latches to hold the frames at a 135 degree angle, where the frames are constructed of tubing having a square cross section, each latch 151 can be constructed of bar stock having a first end and a second end pivotally connected to an upwardly facing portion of the frame at a location near its first end. The bar stock has a leading edge 153 and a trailing edge 155 with at least one notch 157 in the leading edge to ride over and engage an end flanged post 159 protruding from an upwardly facing portion of an adjacent frame. The latches can engage the footer, the header, or the upper or lower window sills, as available.

While certain preferred embodiments of the invention have been described herein, the invention is not to be construed as being so limited, except to the extent that such limitations are found in the claims.

What is claimed is:

1. A portable reconfigurable hunting blind assembly comprising
    a. eight generally rectangular frames joined together side edge to side edge by seven hinges for accordion folding, and
    b. a camouflage covering mounted to each of the frames to define eight panel-shaped wall units, said camouflage covering defining a window in at least some of said wall units,
    wherein the frames are identified as a first frame on a first end of the hunting blind assembly, a second frame adjacent to the first frame, a third frame adjacent to the second frame, a fourth frame adjacent to the third frame, a fifth frame adjacent to the fourth frame, and a sixth frame adjacent to the fifth frame, a seventh frame adjacent to the sixth frame, and an eighth frame adjacent to the seventh frame, said eighth frame forming a second end of the hunting blind assembly,
    wherein the frames are attached by hinges which define hinge lines, and said hinges are identified as a first hinge between the first and second panels, a second hinge between the second and third panels, a third hinge between the third and fourth panels, a fourth hinge between the fourth and fifth panels, a fifth hinge between the fifth and sixth panels, a sixth hinge between the sixth and seventh panels, and a seventh hinge between the seventh and eighth panels,
    wherein the first hinge permits the first frame and the second frame to swing over an angle of about 270 degrees with respect to each other and the third hinge permits the third and fourth frames to swing over an angle of about 270 degrees with respect to each other and the fifth hinge permits the fifth and sixth frames to swing over an angle of about 270 degrees with respect to each other and the seventh hinge permits the seventh and eighth frames to swing over an angle of about 270 degrees with respect to each other,
    wherein each frame is bounded by a pair of uprights of square cross section and adjacent frames are joined together by thermoplastic living hinges alternating between connection to the front sides of adjacent frames and the back sides of adjacent frames, the hinge being placed on the back sides of the frames between the fourth and fifth frames,
    wherein the frames joined on their front sides by the living hinge are spaced apart by a distance of from 1 to 1.5 times the width of a side of the uprights and the frames joined on their back sides by the living hinge are separated by a distance of less than 0.25 times the width of a side of the uprights, so that flat sides of adjacent uprights in the corners are substantially squarely facing each other flat side to flat side when the blind assembly is in a closed square configuration, the frames joined on their front sides by a living hinge forming the corners of the blind assembly.

2. A portable reconfigurable hunting blind assembly as in claim 1 wherein one of the frames carries a door, said door being formed by a generally rectangular door frame mounted within the frame of the panel, said door frame carrying a camouflage covering and functioning as one of the panel-shaped wall units.

3. A portable reconfigurable hunting blind assembly as in claim 2 wherein the camouflage covering mounted to each frame, with the exception of the camouflage covering on the door frame, has an inner surface facing the frame, an outer surface, an upper end, and at least one fastener half on the outer surface near the upper end for attaching a roof cover.

4. A portable reconfigurable hunting blind assembly as in claim 3 further comprising a roof cover positioned over the upper end of the blind and forming a roof, said roof cover having a periphery, a top side, and a bottom side, and a plurality of fastener halves positioned on the bottom side around the periphery for attachment to the fastener halves located on the upper ends of the outer surfaces of the camouflage coverings on the frame.

5. A portable reconfigurable hunting blind as in claim 1 wherein, when in a closed square configuration, the first, third, fifth and seventh hinges bias their adjacent panels towards an octagonal configuration, said hunting blind further comprising means for restraining the panels in the closed square configuration.

6. A portable reconfigurable hunting blind assembly as in claim 1 wherein the camouflage covering mounted to each frame is removably mounted on one side of the frame with a plurality of releasable fasteners.

7. A portable reconfigurable hunting blind assembly comprising
    a. eight generally rectangular frames joined together side edge to side edge by seven hinges for accordion folding, and
    b. a camouflage covering mounted to each of the frames to define eight panel-shaped wall units, said camouflage covering defining a window in at least some of said wall units, wherein the frames are identified as a first frame on a first end of the hunting blind assembly, a second frame adjacent to the first frame, a third frame adjacent to the second frame, a fourth frame adjacent to the third frame, a fifth frame adjacent to the fourth frame, and a sixth frame adjacent to the fifth frame, a seventh frame adjacent to the sixth frame, and an eighth frame adjacent to the seventh frame, said eighth frame forming a second end of the hunting blind assembly, wherein the frames are attached by hinges which define hinge lines, and said hinges are identified as a first hinge between the first and second panels, a second hinge between the second and third panels, a third hinge between the third and fourth panels, a fourth hinge between the fourth and fifth panels, a fifth hinge between the fifth and sixth panels, a sixth hinge between the sixth and seventh panels, and a seventh hinge between the seventh and eighth panels, wherein the first hinge permits the first frame and the second frame to swing over an angle of about 270 degrees with respect to each other and the third hinge permits the third and fourth frames to swing over an angle of about 270 degrees with respect to each other and the fifth hinge permits the fifth and sixth frames to swing over an angle of about 270 degrees with respect to each other and the seventh hinge permits the seventh and eighth frames to swing over an angle of about 270 degrees with respect to each other, said portable reconfigurable hunting blind assembly further comprising a latch element to extend between the fourth and fifth frames when deployed and restrain the fourth and fifth frames against bowing out when the blind assembly is in a closed square configuration.

8. A portable reconfigurable hunting blind assembly comprising
  a. eight generally rectangular frames joined together side edge to side edge by seven hinges for accordion folding, and
  b. a camouflage covering mounted to each of the frames to define eight panel-shaped wall units, said camouflage covering defining a window in at least some of said wall units, wherein the frames are identified as a first frame on a first end of the hunting blind assembly, a second frame adjacent to the first frame, a third frame adjacent to the second frame, a fourth frame adjacent to the third frame, a fifth frame adjacent to the fourth frame, and a sixth frame adjacent to the fifth frame, a seventh frame adjacent to the sixth frame, and an eighth frame adjacent to the seventh frame, said eighth frame forming a second end of the hunting blind assembly, wherein the frames are attached by hinges which define hinge lines, and said hinges are identified as a first hinge between the first and second panels, a second hinge between the second and third panels, a third hinge between the third and fourth panels, a fourth hinge between the fourth and fifth panels, a fifth hinge between the fifth and sixth panels, a sixth hinge between the sixth and seventh panels, and a seventh hinge between the seventh and eighth panels, wherein the first hinge permits the first frame and the second frame to swing over an angle of about 270 degrees with respect to each other and the third hinge permits the third and fourth frames to swing over an angle of about 270 degrees with respect to each other and the fifth hinge permits the fifth and sixth frames to swing over an angle of about 270 degrees with respect to each other and the seventh hinge permits the seventh and eighth frames to swing over an angle of about 270 degrees with respect to each other, said portable reconfigurable hunting blind assembly further comprising a strap to extend between opposite walls of the blind when deployed to restrain the sixth and seventh frames and the second and third frames from bowing out when the blind is in a closed square configuration.

9. A portable reconfigurable hunting blind assembly comprising
  a. eight generally rectangular frames joined together side edge to side edge by seven hinges for accordion folding, and
  b. a camouflage covering mounted to each of the frames to define eight panel-shaped wall units, said camouflage covering defining a window in at least some of said wall units, wherein the frames are identified as a first frame on a first end of the hunting blind assembly, a second frame adjacent to the first frame, a third frame adjacent to the second frame, a fourth frame adjacent to the third frame, a fifth frame adjacent to the fourth frame, and a sixth frame adjacent to the fifth frame, a seventh frame adjacent to the sixth frame, and an eighth frame adjacent to the seventh frame, said eighth frame forming a second end of the hunting blind assembly, wherein the frames are attached by hinges which define hinge lines, and said hinges are identified as a first hinge between the first and second panels, a second hinge between the second and third panels, a third hinge between the third and fourth panels, a fourth hinge between the fourth and fifth panels, a fifth hinge between the fifth and sixth panels, a sixth hinge between the sixth and seventh panels, and a seventh hinge between the seventh and eighth panels, wherein the first hinge permits the first frame and the second frame to swing over an angle of about 270 degrees with respect to each other and the third hinge permits the third and fourth frames to swing over an angle of about 270 degrees with respect to each other and the fifth hinge permits the fifth and sixth frames to swing over an angle of about 270 degrees with respect to each other and the seventh hinge permits the seventh and eighth frames to swing over an angle of about 270 degrees with respect to each other, said portable reconfigurable hunting blind assembly further comprising a latch element to extend between the eighth and first frames when deployed to restrain the eighth and first frames from bowing out when the blind assembly is in a closed square configuration.

10. A portable reconfigurable portable hunting blind comprising
  a. eight generally rectangular frames joined together side edge to side edge by seven hinges for accordion folding, and
  b. a camouflage covering mounted to each of the frames to define eight panel-shaped wall units, said camouflage covering defining a window in at least some of said wall units, wherein the frames are identified as a first frame on a first end of the hunting blind assembly, a second frame adjacent to the first frame, a third frame adjacent to the second frame, a fourth frame adjacent to the third frame, a fifth frame adjacent to the fourth frame, and a sixth frame adjacent to the fifth frame, a seventh frame adjacent to the sixth frame, and an eighth frame adjacent to the seventh frame, said eighth frame forming a second end of the hunting blind assembly, wherein the frames are attached by hinges which define hinge lines, and said hinges are identified as a first hinge between the first and second panels, a second hinge between the second and third panels, a third hinge between the third and fourth panels, a fourth hinge between the fourth and fifth panels, a fifth hinge between the fifth and sixth panels, a sixth hinge between the sixth and seventh panels, and a seventh hinge between the seventh and eighth panels, wherein the first hinge permits the first frame and the second frame to swing over an angle of about 270 degrees with respect to each other and the third hinge permits the third and fourth frames to swing over an angle of about 270 degrees with respect to each other and the fifth hinge permits the fifth and sixth frames to swing over an angle of about 270 degrees with respect to each other and the seventh hinge permits the seventh and eighth frames to swing over an angle of about 270 degrees with respect to each other, wherein one of the frames carries a door, said door being formed by a generally rectangular door frame mounted within the frame of the panel, said door frame carrying a camouflage covering and functioning as one of the panel-shaped wall units, wherein the camouflage covering mounted to each frame is removably mounted on one side of the frame with a plurality of releasable fasteners, and wherein frames 1, 2, 7 and 8 have top plates across their upper end and frames 3, 4, 5 and 6 are lacking in top plates across their upper ends.

11. A portable reconfigurable portable hunting blind assembly as in claim 10 the camouflage coverings on frames 3, 4, 5 and 6 have a stiffener element extending across their upper ends and the camouflage coverings on frames 1, 2, 7 and 8 are lacking in a stiffener element across their upper ends.

12. A portable reconfigurable hunting blind assembly as in claim 11 wherein the camouflage coverings on frames 3, 4, 5 and 6 roll down from the upper ends and fastener halves are positioned at the upper end of frames 3, 4, 5 and 6 for attachment to complementary fastener halves on a periphery of a covering forming a roof.

13. A portable reconfigurable hunting blind assembly as in claim 11 wherein each frame is bounded by a pair of uprights of square cross section and adjacent frames are joined together by thermoplastic living hinges alternating between connection to the front sides of adjacent frames and the back sides of adjacent frames, the hinge being placed on the back sides of the frames between the fourth and fifth frames.

14. A portable reconfigurable hunting blind assembly as in claim 13 wherein the frames joined on their front sides by the living hinge are spaced apart by a distance of from 1 to 1.5 times the width of a side of the uprights and the frames joined on their back sides by the living hinge are separated by a distance of less than 0.25 times the width of a side of the uprights, so that flat sides of adjacent uprights are substantially squarely facing each other flat side to flat side when the blind assembly is in a square configuration, the frames joined on their front sides by a living hinge forming the corners of the blind assembly.

15. A portable reconfigurable hunting blind assembly comprising
   a. eight generally rectangular frames joined together side edge to side edge by seven hinges for accordion folding, and
   b. a camouflage covering mounted to each of the frames to define eight panel-shaped wall units, said camouflage covering defining a window in at least some of said wall units, wherein the frames are identified as a first frame on a first end of the hunting blind assembly, a second frame adjacent to the first frame, a third frame adjacent to the second frame, a fourth frame adjacent to the third frame, a fifth frame adjacent to the fourth frame, and a sixth frame adjacent to the fifth frame, a seventh frame adjacent to the sixth frame, and an eighth frame adjacent to the seventh frame, said eighth frame forming a second end of the hunting blind assembly, wherein the frames are attached by hinges which define hinge lines, and said hinges are identified as a first hinge between the first and second panels, a second hinge between the second and third panels, a third hinge between the third and fourth panels, a fourth hinge between the fourth and fifth panels, a fifth hinge between the fifth and sixth panels, a sixth hinge between the sixth and seventh panels, and a seventh hinge between the seventh and eighth panels, wherein the first hinge permits the first frame and the second frame to swing over an angle of about 270 degrees with respect to each other and the third hinge permits the third and fourth frames to swing over an angle of about 270 degrees with respect to each other and the fifth hinge permits the fifth and sixth frames to swing over an angle of about 270 degrees with respect to each other and the seventh hinge permits the seventh and eighth frames to swing over an angle of about 270 degrees with respect to each other, further comprising at least two latches each carried by a separate panel and deployable to connect the second panel to the third panel at an angle of about 135 degrees and the sixth panel to the seventh panel at an angle of about 135 degrees.

16. A portable reconfigurable hunting blind assembly comprising
   a. eight generally rectangular frames joined together side edge to side edge by seven hinges for accordion folding, and
   b. a camouflage covering mounted to each of the frames to define eight panel-shaped wall units, said camouflage covering defining a window in at least some of said wall units, wherein the frames are identified as a first frame on a first end of the hunting blind assembly, a second frame adjacent to the first frame, a third frame adjacent to the second frame, a fourth frame adjacent to the third frame, a fifth frame adjacent to the fourth frame, and a sixth frame adjacent to the fifth frame, a seventh frame adjacent to the sixth frame, and an eighth frame adjacent to the seventh frame, said eighth frame forming a second end of the hunting blind assembly, wherein the frames are attached by hinges which define hinge lines, and said hinges are identified as a first hinge between the first and second panels, a second hinge between the second and third panels, a third hinge between the third and fourth panels, a fourth hinge between the fourth and fifth panels, a fifth hinge between the fifth and sixth panels, a sixth hinge between the sixth and seventh panels, and a seventh hinge between the seventh and eighth panels, wherein the first hinge permits the first frame and the second frame to swing over an angle of about 270 degrees with respect to each other and the third hinge permits the third and fourth frames to swing over an angle of about 270 degrees with respect to each other and the fifth hinge permits the fifth and sixth frames to swing over an angle of about 270 degrees with respect to each other and the seventh hinge permits the seventh and eighth frames to swing over an angle of about 270 degrees with respect to each other, wherein one of the frames carries a door, said door being formed by a generally rectangular door frame mounted within the frame of the panel, said door frame carrying a camouflage covering and functioning as one of the panel-shaped wall units, wherein one of the coverings for the frames defines a flap in its lower portion having a plurality of releasable fasteners on its periphery forming a dog door.

* * * * *